(12) United States Patent
Schäfer

(10) Patent No.: US 7,650,837 B2
(45) Date of Patent: Jan. 26, 2010

(54) PRINTING MACHINE HAVING A ROTATION TRANSMITTER FOR INTRODUCING A LIQUID OR GASEOUS MEDIUM

(75) Inventor: Karl Robert Schäfer, Rimpar (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 538 days.

(21) Appl. No.: 11/579,416

(22) PCT Filed: Apr. 29, 2005

(86) PCT No.: PCT/EP2005/051975

§ 371 (c)(1),
(2), (4) Date: Nov. 2, 2006

(87) PCT Pub. No.: WO2005/108079

PCT Pub. Date: Nov. 17, 2005

(65) Prior Publication Data

US 2007/0214980 A1 Sep. 20, 2007

(30) Foreign Application Priority Data

May 3, 2004 (DE) .................. 10 2004 021 606

(51) Int. Cl.
*B41F 27/12* (2006.01)
(52) U.S. Cl. .............. 101/216; 101/415.1; 101/375
(58) Field of Classification Search ........... 101/415.1, 101/477, 216, 375
See application file for complete search history.

(56) References Cited

U.S. PATENT DOCUMENTS

| 4,831,825 | A | 5/1989 | Jeschke |
| 5,110,159 | A | 5/1992 | Herold et al. |
| 5,255,604 | A | 10/1993 | Durr |
| 5,439,029 | A | 8/1995 | Becker |
| 6,862,991 | B2 | 3/2005 | Schafeer |
| 2003/0172820 | A1 | 9/2003 | Geider et al. |

FOREIGN PATENT DOCUMENTS

| DE | 36 11 243 A1 | 10/1987 |
| DE | 42 10 009 C2 | 5/1994 |
| DE | 42 09 341 C2 | 3/1999 |
| EP | 0 435 164 A1 | 12/1990 |
| EP | 0 554 815 B1 | 1/1993 |
| EP | 0 562 269 A1 | 9/1993 |
| EP | 0 570 786 A1 | 11/1993 |
| EP | 0 570 786 B1 | 11/1993 |
| WO | WO 02/43962 A2 | 6/2002 |

*Primary Examiner*—Leslie J Evanisko
(74) *Attorney, Agent, or Firm*—Jones, Tullar & Cooper, P.C.

(57) ABSTRACT

A rotating element of a printing machine is connected to a rotation transmitter that is usable to introduce a liquid or a gaseous medium into the rotating element. The rotation transmitter includes a rotor that is rotatable with the rotating element, and a stator that is secured against rotation. At least one stator channel section cooperates with at least one rotor channel section to provide a fluid flow path for the medium into the rotating element. Axially oriented and mutually opposite contact surfaces, which are against one another when the liquid or gaseous medium is introduced into the rotating element of the printing machine, are provided on the rotor and on the stator.

23 Claims, 6 Drawing Sheets

PRINTING MACHINE HAVING A ROTATION TRANSMITTER FOR INTRODUCING A LIQUID OR GASEOUS MEDIUM

CROSS-REFERENCE TO RELATED APPLICATIONS

This U.S. patent application is the U.S. national phase, under 35 USC 371, of PCT/EP2005/051975, filed Apr. 29, 2005; published as WO 2005/108079 A1 on Nov. 17, 2005; and claiming priority to DE 10 2004 021 606.1, filed May 3, 2004, the disclosures of which are expressly incorporated herein by reference.

FIELD OF THE INVENTION

The present invention is directed to devices of a printing press having a rotation transmitter for introducing a liquid or gaseous medium into a rotating component of a printing press. The device includes a rotor, which is arranged to rotate with the rotating component of the printing press, and a stator that is secured against rotation. At least one channel section is provided in both of the stator and the rotor.

BACKGROUND OF THE INVENTION

Rotation transmitters are generally known, such as, for example, the devices which are disclosed in EP 0 570 786 B1 and in EP 0 544 815 B1. Rotation transmitters of this general type are typically used, though are by no means exclusively used, for transferring compressed air into a forme cylinder. Such a transference of compressed air is done to be able to, for example, actuate a clamping body for use in fastening the printing plates to the forme cylinder, by use of the compressed air. A plate clamping body of this type, that is appropriate for fixing a printing plate on the forme cylinder, is generally known from WO 02/43962 A2, for example.

US 2003/0172820 A1; EP 0 562 269 A, and DE 42 09 341 C2 each disclose a rotating introduction system for printing presses. The contact surfaces of the rotor and stator are arranged in the axial direction of the rotating introduction system.

SUMMARY OF THE INVENTION

The object of the present invention is to provide devices of a printing press having a rotation transmitter for use in introducing a liquid or gaseous medium into a rotating component of a printing press.

This object is attained, according to the present invention, by the provision of a rotation transmitter which has a rotor, that is arranged to rotate with the rotating printing press part, and a stator which is fixed against rotation. At least one channel is provided in each of the rotor and the stator. The liquid or gaseous medium is caused to flow through the stator channel, and through the rotor channel, when the two are aligned. The rotor channel and the stator channel each extend axially.

One advantage of the device with a rotation transmitter, in accordance with the present invention, is that a contact surface between the rotor and the stator, and the sealing joint resulting between them, may be sealed in a considerably easier fashion. In contrast to the generally-known rotation transmitters, in which the rotor and the stator come into contact with one another on cylindrical surfaces, the axial orientation of the rotation transmitter, in accordance with the present invention, allows for flat contact surfaces to be provided, which flat contact surfaces may be produced in a cost-effective manner and which may be sealed using simple sealing procedures.

The rotation transmitter in accordance with the present invention offers considerable advantages, especially when several different functional elements on the printing press part must be supplied with compressed air, although this supplying of compressed air must not necessarily occur on all of the functional elements at the same time. This is the case, such as, for example, when several printing plates are to be attached to one forme cylinder. The fastening of the various printing plates to the forme cylinder must not occur at the same time. By appropriately arranging or positioning the first channel sections in the stator in a circular array, around the rotational axis of the rotor, it is possible for the inlet openings, which are embodied, for example, in segments, of various second channel sections, to be selectively connected by rotating the forme cylinder against the first channel sections. In this manner, it is possible for a plurality of various functional elements to be actuated, using only a few control valves, with the various control valves being selectively connected to their respectively assigned functional elements by rotating the printing press part.

BRIEF DESCRIPTION OF THE DRAWINGS

A preferred embodiment of the present invention is shown in the drawing and is described in greater detail below.

Shown are.

DESCRIPTION OF THE PREFERRED EMBODIMENT

Figure 1:
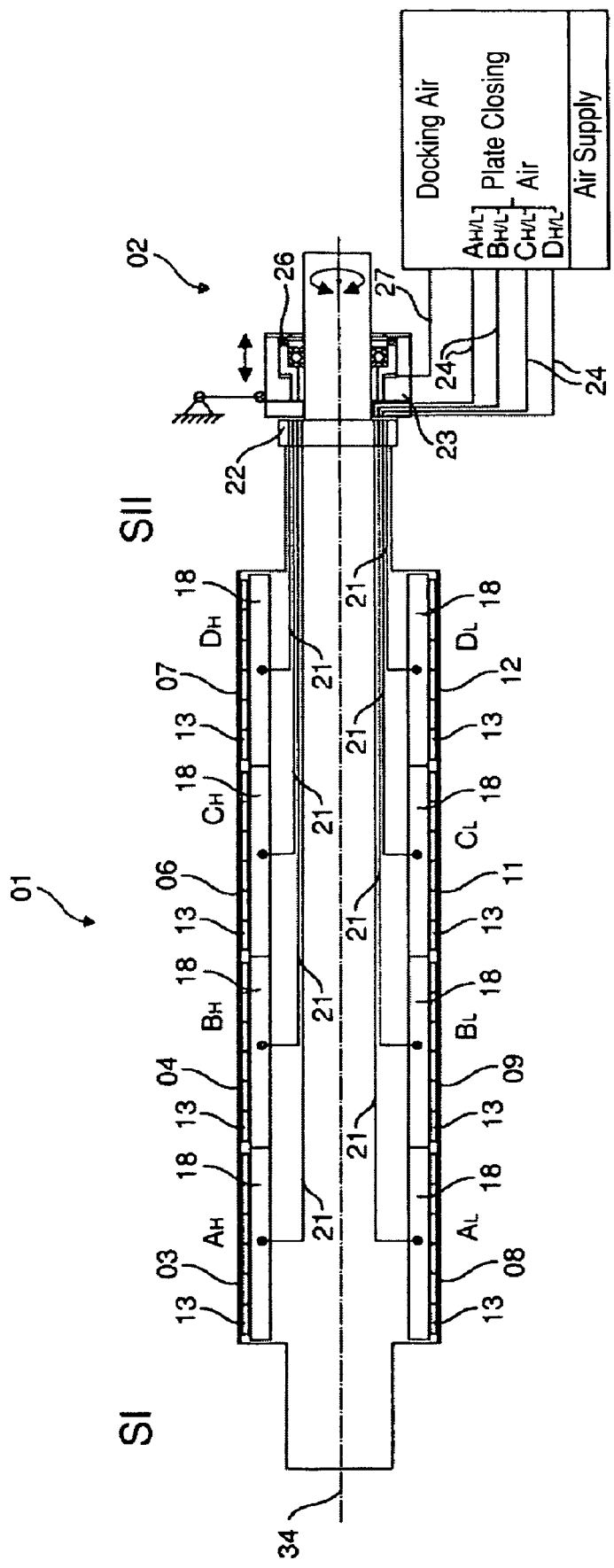
FIG. 1 a schematic side elevation view of a forme cylinder with a rotation transmitter in accordance with the present invention.

FIG. 1 shows a schematic depiction of a forme cylinder 01 having a rotation transmitter 02 attached to a first end of the forme cylinder 01 and being usable for transmitting compressed air from a compressed air supply, which is not specifically shown, into the forme cylinder 01. A total of eight printing plates 03, 04, 06, 07, 08, 09, 11, and 12 may be attached to the circumference of the forme cylinder 01. The printing plates 03, 04, 06, and 07, are arranged one next to the other in the axial direction on one side of the circumference of the forme cylinder 01. The printing plates 08, 09, 11, and 12 are arranged in a similar manner on the other side of the circumference of the forme cylinder 01. The printing plates 03 and 08 are arranged one after the other, in a direction of rotation of the forme cylinder 01, as are the printing plates 04 and 09, the printing plates 06 and 11, and the printing plates 07 and 12. Instead of the depicted four printing plates being arranged next to one another in the axial direction of the forme cylinder 01, it is naturally also possible for two, three, five, six, seven, or eight such printing plates to be arranged next to one another in the axial direction on a forme cylinder 01.

Eight printing plate end fixing devices 13, which may each be individually activated, are provided in the barrel of the forme cylinder 01 and are utilized for fixing or securing the respective printing plates 03 to 12 to the forme cylinder 01. The structure and function of the fixing devices 13 will be explained below with reference to the depiction in FIG. 2.

On its jacket or circumferential surface, the forme cylinder 01 has two diametrically spaced channels 14, which are each pointing radially inwards and which are extending in the axial direction of the forme cylinder 01. The beveled ends of two printing plates, which are arranged one after the other in the direction of rotation of the forme cylinder 01, such as, for example, the beveled ends of the printing plates 03 and 08, extend into the channel 14. The diametrically opposite channel 14, which is also provided in the forme cylinder 01 for fixing the other ends of both of the printing plates 03 and 08, is embodied in a functionally complimentary fashion.

Figure 2:
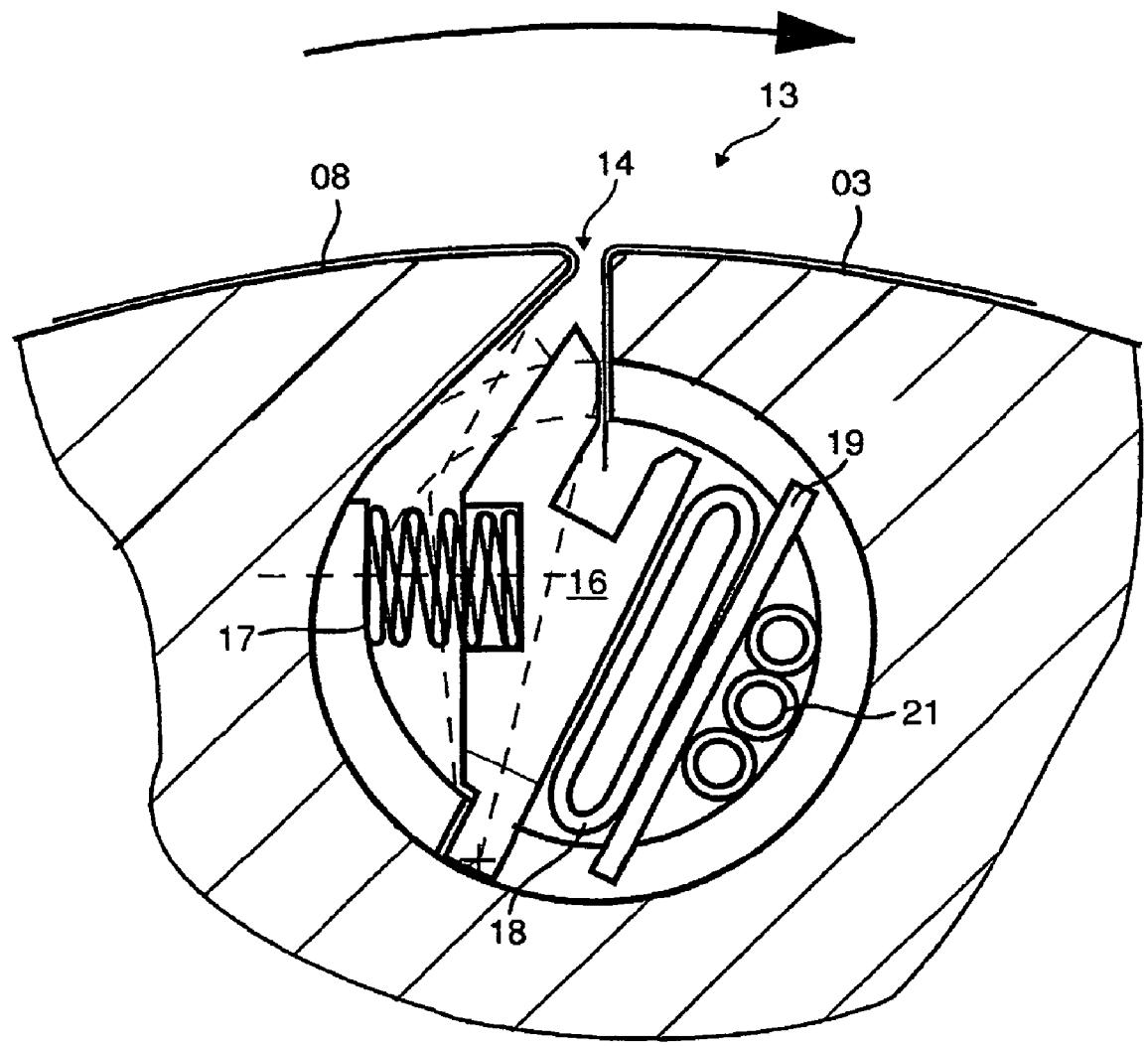
in FIG. 2 an enlarged cross-sectional view of a portion of the forme cylinder of FIG. 1 and showing the fixing device of the forme cylinder.

One beveled end of a printing plate, such as, for example, the beveled end of the printing plate 08 in FIG. 2, is hooked into the channel 14 in a form-fitting manner. A clamping piece 16, that is spring loaded by a spring 17, is used to fix the other beveled end of another printing plate, such as, for example, the beveled end of the printing plate 03 in FIG. 2. A pressure hose segment 18 is arranged between the clamping element 16 and a counter bearing 19. This pressure hose segment 18 is provided for opening the clamping piece 16. Channel sections 21 are usable to provide the various pressure hose segments 18 with compressed air. By increasing the pressure in the pressure hose segment 18, it is possible for the clamping piece 16 to be pivoted against the spring force of the spring 17. The result is that the beveled end of the printing plate 03 is released. The printing plate end fixing device 13 may also have several clamping pieces 16, i.e., it may be constructed in several parts. Each such printing plate end fixing device 13 is to be understood to mean the entire fixing device 13 for one printing plate 03, 04, 06, 07, 08, 09, 11, and 12.

As can also be seen from FIG. 1, an assigned pressure hose segment 18 is provided for each printing plate 03 to 12. In one preferred embodiment, a total of eight different forme cylinder channel sections 21 are provided in the interior of the forme cylinder 01, which forme cylinder channel sections 21 connect a rotor 22 of the rotation transmitter 02 to the various pressure hose segments 18.

Figure 6:
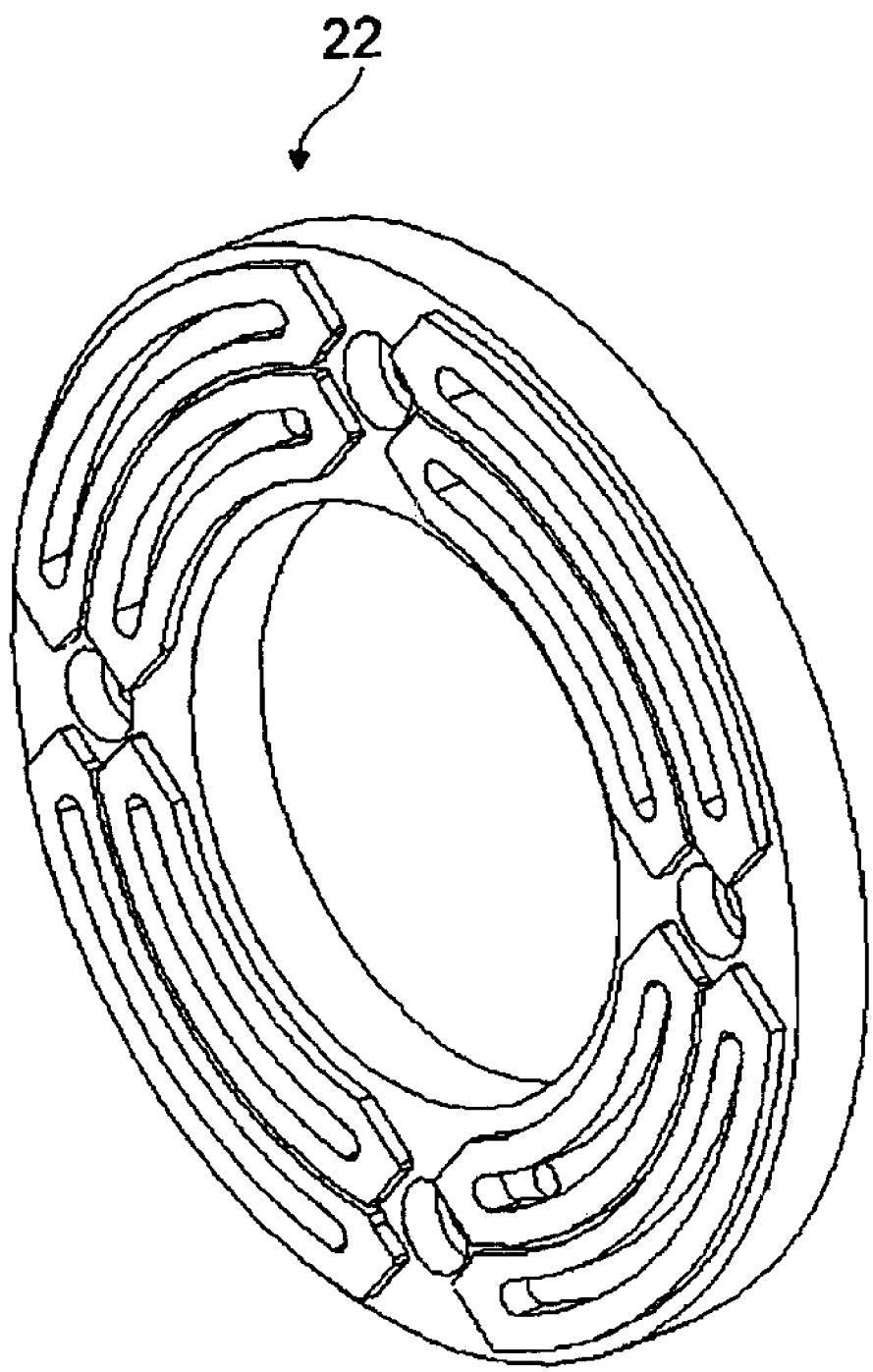
in FIG. 6 a schematic, perspective depiction of a rotor.

The rotor 22 is preferably in the shape of a circular disc, as may be seen in FIG. 6. A pin of the forme cylinder 01 protrudes through the rotor 22 so that the rotor 22 of the rotation transmitter 02 rotates with the forme cylinder 01.

A stator 23 of the rotation transmitter 02 which, for example, may be attached to the frame of a printing press in a rotationally secure manner is aligned with the rotor 22 of the rotation transmitter 02, as seen in FIG. 1. The stator 23 of the rotation transmitter 02 is connected to an air supply by the use of four first channel sections 24, with a pressure regulator valve being provided in each such channel section 24 for regulating the pressure of the compressed air which is supplied to the stator 23. The stator 23 of the rotation transmitter 02 is mounted in an axially displaceable fashion and is pushed away from the rotor 22 by a spring force provided by spaced plate springs 26. To bring the stator 23 axially into contact with the rotor 22, a pressure line 27 is loaded with compressed air such that the resulting air pressure pushes the stator 23 to the left in the axial direction and into contact with the rotor 22 of the rotation transmitter 02.

Figure 5:
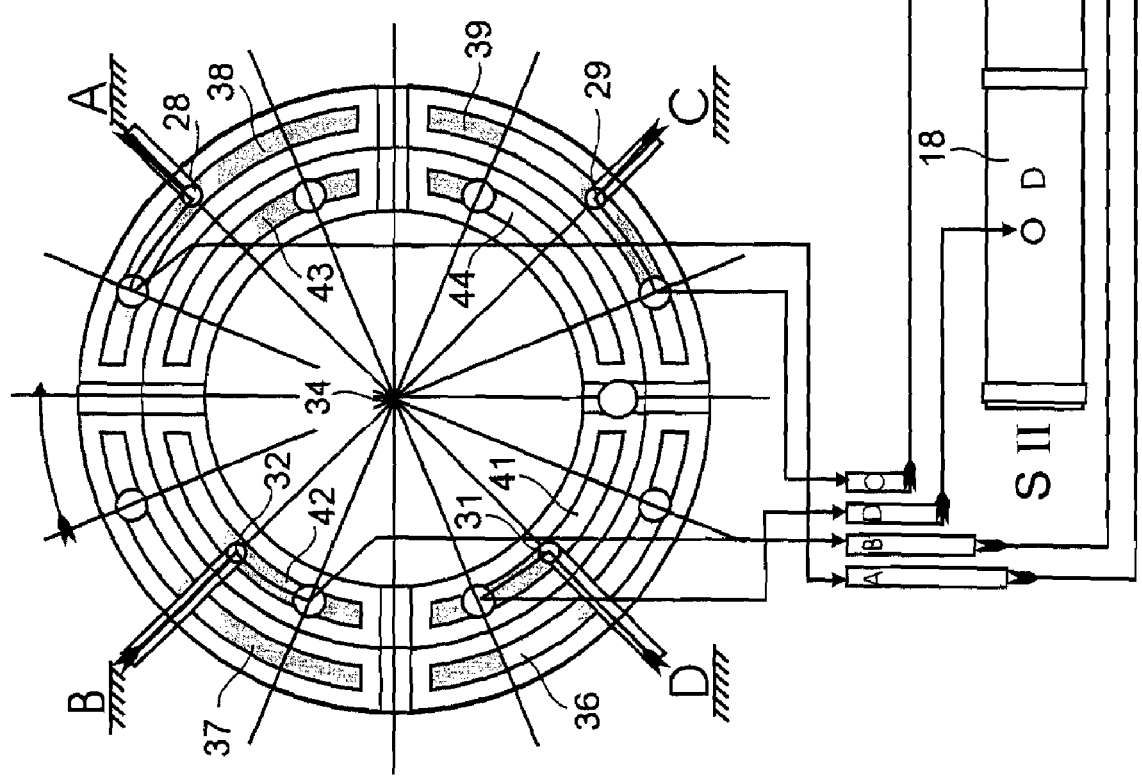
in FIG. 5 a schematic view of a rotor of the rotation transmitter in accordance with the present invention, on the forme cylinder in accordance with FIG. 3, rotated by 180°.

FIG. 5 shows the four different pressure hose segments 18 and the manner in which they are provided with compressed air by the rotor 22 of the rotation transmitter 02 in a second position. The rotor 22 was rotated by approximately 180° with respect to the forme cylinder 01.

Figure 4:
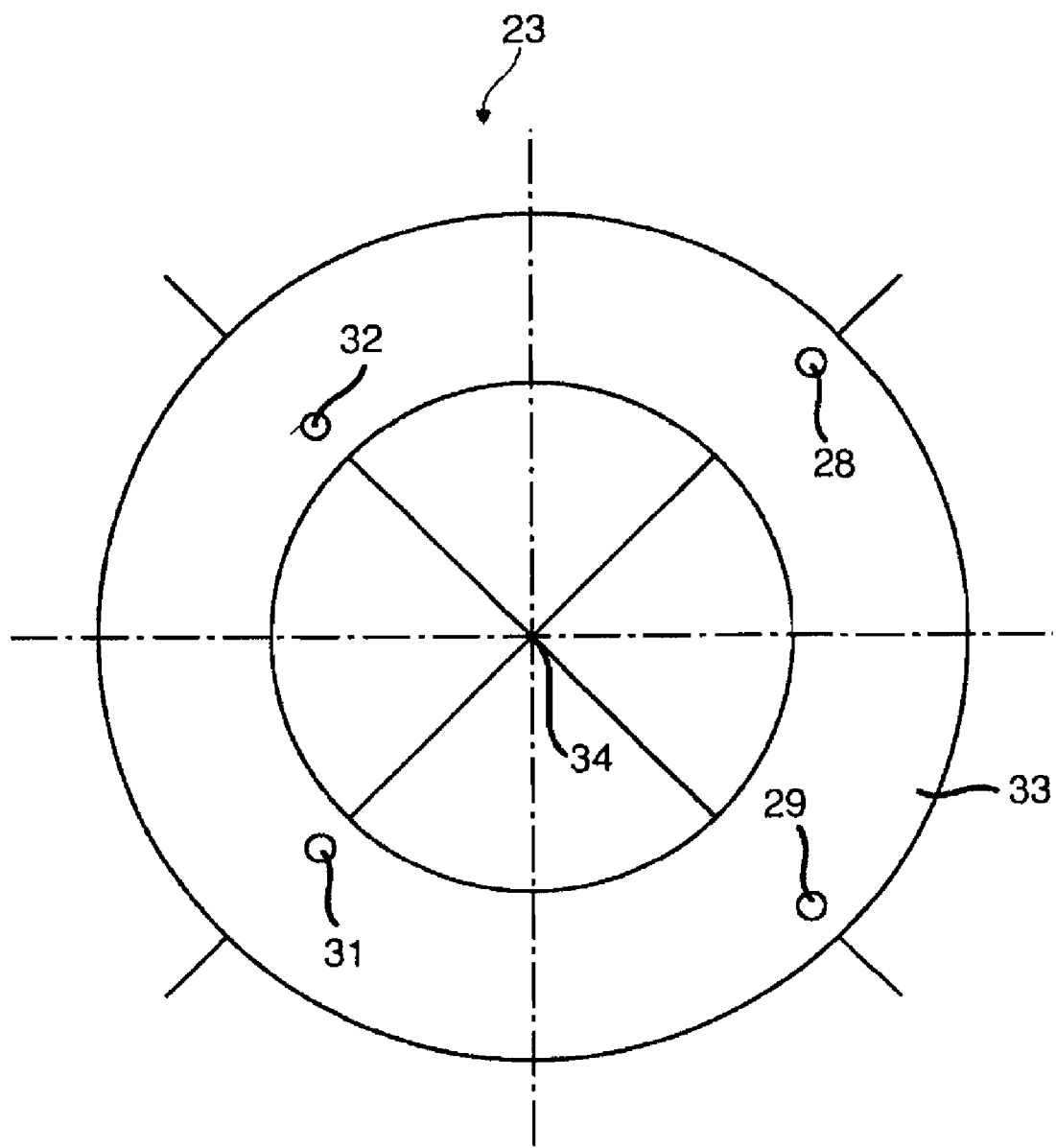
in FIG. 4 a schematic view of a stator of the rotation transmitter on the forme cylinder in accordance with FIG. 1.

In the top view of the contact surface 33 of the stator 23, as shown in FIG. 4, there is depicted the arrangement of the outlet openings 28, 29, 31, and 32 into which the first channel sections 24 on the stator 23 empty.

Figure 3:
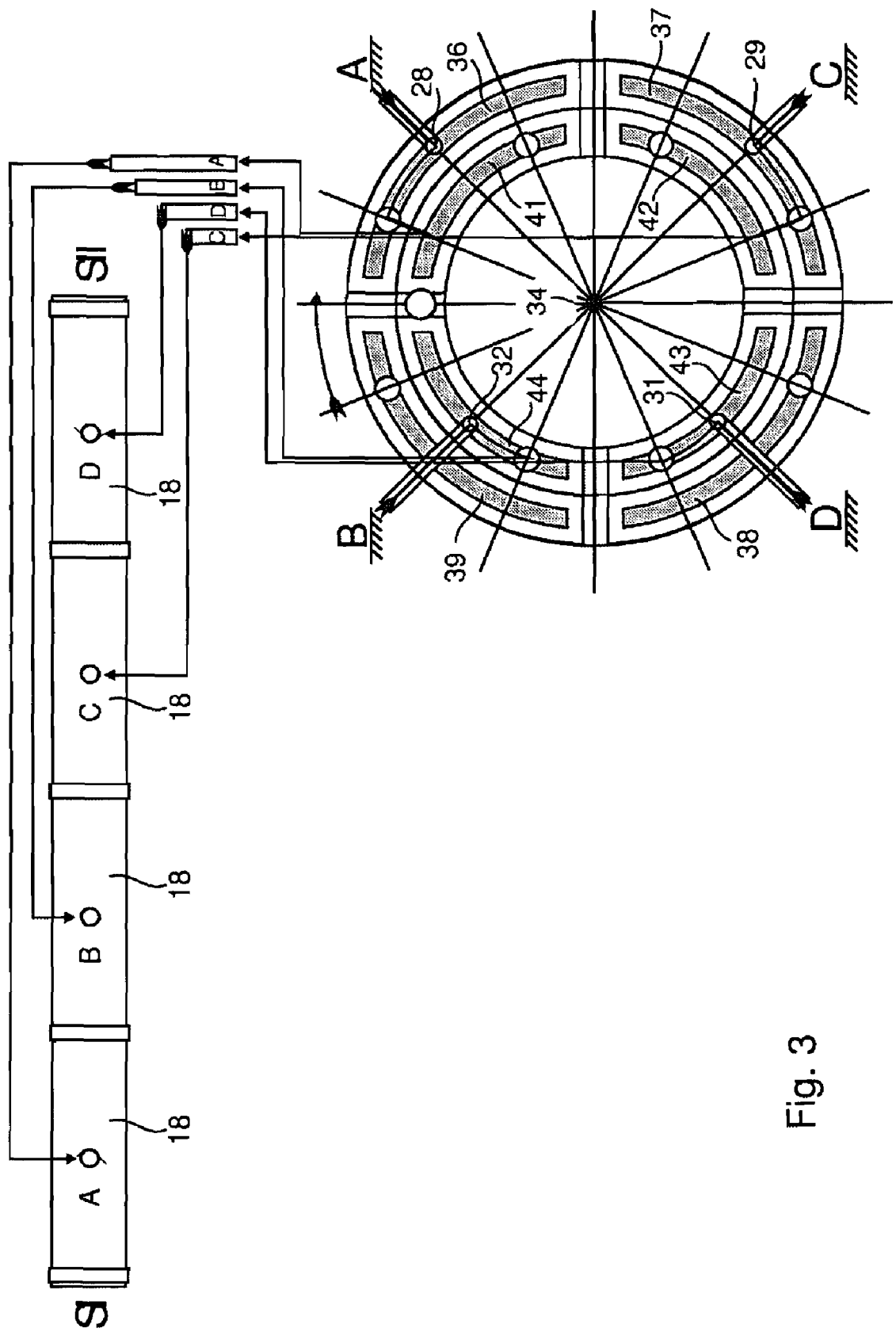
in FIG. 3 various possibilities for the pressurization of the fixing device of the forme cylinder in accordance with FIG. 1 in a first position.

In FIG. 3, the actuation of the pressure hose segments 18, when these pressure hose segments 18 are being pressurized, for opening the plate end fixing devices 13 for the printing plates 03, 04, 06, and 07, is shown by way of example. In the case of the forme cylinder 01, the only printing plates that are removed are those with a plate end fixing device 13 that points or is facing upwards. None of the plate end fixing devices 13 that point downwards must be opened. Four different compressed air supplies, with their associated pressure regulation valves, which must be switched each time, are sufficient to actuate the eight different plate end fixing devices 13 which are situated on the forme cylinder 01. To implement this economizing measure in a structural fashion, the outlet openings 28 and 29 as well as the outlet openings 31 and 32 are arranged on two different concentrically arranged circular lines around the rotational axis 34 of the forme cylinder 01, as may be seen in FIGS. 3 and 5.

Four arcuately-shaped, radially outwardly located compressed air inlet openings 36, 37, 38, and 39 are formed on the rotor 22 and are assigned to the two compressed air outlet openings 28 and 29 that are arranged on an outer circular line. Four arcuately-shaped, radially inwardly located compressed air inlet openings 41, 42, 43, and 44 are formed on the rotor 22 and are assigned to the two compressed air outlet openings 31 and 32 arranged on an inner circular line. By correspondingly rotating the rotor 22, two of the outer, arcuately-shaped compressed air inlet openings 36 to 39 or two of the inner, arcuately-shaped compressed air inlet openings 41 to 44 may always be connected to the compressed air supply of the first channel segments 24 by the outlet openings 28 to 32. The inlet openings 36 to 39 and 41 to 44 and/or the outlet openings 28 to 32 may have elastic sealing material or may be provided with an elastic seal as depicted in FIG. 6 with respect to the rotor 22.

If, for example, the printing plates 03, 04, 06, and 07, which are all located on one circumferential side of the forme cylinder 01, should be removed from the forme cylinder 01, the forme cylinder 01 is rotated for a sufficient length of time so that the cylinder channel 14 points perpendicularly upwards. This position of the forme cylinder 01 corresponds to the position of the rotor 22 which is shown in FIG. 3. In this position, the stator 23, with its contact surface 33, which is shown in FIG. 4, is pressed, in a pressure-tight manner, against the contact surface of the rotor 22 such that compressed air may flow out of the outlet opening 28 of stator 23, which is indicated in FIG. 3 into the inlet opening 36 of the rotor 22, compressed air may flow out of the outlet opening 29 of stator 23, which is indicated in FIG. 3, into the inlet opening 37 of the rotor 22, compressed air may flow out of the outlet opening 31 of stator 28, which is indicated in FIG. 3 into the inlet opening 43, and compressed air may flow out of the outlet opening 32 of stator 23, which is indicated in FIG. 3 into the inlet opening 44. In this position, the four other outlet openings 41, 42, 38, and 39 on the rotor 22 are not connected to the compressed air supply.

If the four other pressure hose segments 18 are then to be connected to the compressed air supply, in order to be able to now actuate the plate end fixing devices 13 for the printing plate ends on the printing plates 08, 09, 11, and 12, the rotor 22, together with the forme cylinder 01, is rotated by approximately 180°. The rotor inlet openings 38, 39, 41, and 42 on the compressed air supply are now connected to the stator outlet openings 28, 29, 31, and 32, whereas the rotor inlet openings 36, 37, 43, and 44 are no longer being supplied with compressed air. Thus, by rotating the forme cylinder 01 through 180°, the compressed air supply is switched, as may be seen in FIG. 5.

Because the inlet openings 36 to 44 are structured in the shape of an arc, the various, plate end fixing devices 13 may each be actuated in an angle range of approximately 60°, such that the rotor 22 does not have to be positioned absolutely precisely aligned relative to the stator 23. It is also possible, for example, for the rotor to be rotated by −15° to +45' when the stator 23 is engaged in order to allow a printing plate to be mounted or removed when the plate end fixing device 13 is open.

FIG. 6 shows a schematic, perspective depiction of the rotor 22.

While a preferred embodiment of devices of a printing press having a rotation transmitter, for introducing a liquid or gaseous medium into a rotating component of a printing press, in accordance with the present invention has been set forth fully and completely hereinabove, it will be apparent to one of skill in the art that various changes in, for example, the source of the liquid or gaseous medium, the specific structure of the printing formes and the like could be made without departing from the true spirit and scope of the present invention which is accordingly to be limited only by the appended claims.

What is claimed is:

1. A rotation transmitter adapted for use with a forme cylinder of a printing press comprising:
   a forme cylinder body supported for rotation about an axis of rotation;
   a rotor adapted to rotate with said cylinder body and having a rotor contact surface;
   a stator fixed against rotation and having a stator contact surface;
   a first number of flow channels in said stator and each adapted to receive a flowable medium;
   a second number of flow channels in said rotor and each adapted to deliver the flowable medium received from said stator to said cylinder body, said rotor contact surface and said stator contact surface being in engagement during introduction of the flowable medium into said cylinder body, said second number of rotor flow channels being greater than said first number of stator flow channels;
   means connecting said rotor to said cylinder body for rotation with said cylinder body;
   first and second printing plates arranged one behind the other on said forme cylinder body in a direction of said rotation of said forme cylinder body;
   a first group of at least four inlet openings in selected ones of said rotor flow channels;
   a second group of at least four inlet openings in other selected ones of said rotor flow channels; and
   a group of outlet openings in said stator flow channels, said first group of said inlet openings being in fluid communication with said group of outlet openings in a first rotational position of said forme cylinder, said second group of said inlet openings being in fluid communication with said group of outlet openings in a second rotational position of said forme cylinder, said second rotational position being different from said first rotational position.

2. The rotation transmitter of claim 1 wherein said rotor contact surface and said stator contact surface are axially-opposed.

3. The rotation transmitter of claim 1 wherein said engagement of said rotor contact surface and said stator contact surface is a pressure-tight engagement.

4. The rotation transmitter of claim 1 further including at least one printing plate end fixing device and being usable to secure an end of at least one of said printing plates on said cylinder body, said at least one printing plate end fixing device being actuable by said flowable medium from one of said second number of flow channels in said rotor.

5. The rotation transmitter of claim 4 further including an inlet opening in said rotor associated with each said printing plate end fixing device.

6. The rotation transmitter of claim 4 further including at least four of said printing plate end fixing devices on said cylinder body.

7. The rotation transmitter of claim 6 further including at least eight of said printing plate end fixing devices on said cylinder body and arranged in pairs one behind the other in a circumferential direction of said cylinder body.

8. The rotation transmitter of claim 1 further including a plurality of said printing plates secured axially side by side on said cylinder body.

9. The rotation transmitter of claim 8 further including an individually actuable printing plate end fixing device in said cylinder body for each said printing plate.

10. The rotation transmitter of claim 1 further including an individually actuable printing plate end fixing device for each said printing plate.

11. The rotation transmitter of claim 1 wherein at least one of said rotor and said stator is axially displaceable.

12. The rotation transmitter of claim 11 further including one of a hydraulic and a pneumatic drive device for axially displacing said one of said rotor and said stator.

13. The rotation transmitter of claim 11 further including springs usable to displace one of said rotor and said stator.

14. The rotation transmitter of claim 1 wherein said rotor and said stator are positionable in an idle position out of contact with each other, and in a functional position in contact with each other.

15. The rotation transmitter of claim 14 further including springs usable to bring said rotor and said stator to said idle position.

16. The rotation transmitter of claim 1 wherein said number of said second flow channels is an integer multiple of said first flow channels.

17. The rotation transmitter of claim 1 wherein each of said second flow channels is selectively assigned to one of said first flow channels.

18. The rotation transmitter of claim 17 wherein all of said second flow channels assigned to each one of said first flow channels are arranged in a circle on said rotor with a rotor circle radius corresponding to a distance of said assigned first flow channels from said axis of rotation.

19. The rotation transmitter of claim 18 wherein said second flow channels are each positioned in the shape of an arc of said circle.

20. The rotation transmitter of claim 1 further including arranging said inlet openings in radially adjacent ones of said second number of flow channels at first and second angular positions, different from each other.

21. The rotation transmitter of claim 1 further including at least first and second printing plate end fixing devices on said cylinder body and arranged one behind the other in a circumferential direction of said cylinder body.

22. The rotation transmitter of claim 21 wherein at least one of said second flow channels is assigned to each said printing plate end fixing device.

23. The rotation transmitter of claim 22 wherein an inlet opening of a first one of said printing plate end fixing devices is in communication with one of said first number of stator flow channels in said first rotational position of said cylinder body and further wherein an inlet opening of a second one of said printing plate end fixing devices is in communication with one of said first number of stator flow channels in said second rotational position of said cylinder body.

* * * * *